(12) United States Patent
Dillon, II et al.

(10) Patent No.: US 11,614,026 B2
(45) Date of Patent: Mar. 28, 2023

(54) INTERCHANGEABLE COOLANT SENSOR FOR VEHICLE APPLICATIONS AND METHODS OF MANUFACTURE AND USE THEREOF

(71) Applicant: Wheeler Fleet Solutions, Co., Somerset, PA (US)

(72) Inventors: Charles E Dillon, II, Davidsville, PA (US); Jonathon Kimmel, Davidsville, PA (US); David Gontis, Berlin, PA (US)

(73) Assignee: WHEELER FLEET SOLUTIONS, CO., Somerset, PA (US)

( * ) Notice: Subject to any disclaimer, the term of this patent is extended or adjusted under 35 U.S.C. 154(b) by 701 days.

(21) Appl. No.: 16/694,895

(22) Filed: Nov. 25, 2019

(65) Prior Publication Data
US 2020/0328036 A1    Oct. 15, 2020

(51) Int. Cl.
*F01P 11/18*    (2006.01)
*H01H 9/08*    (2006.01)
(Continued)

(52) U.S. Cl.
CPC .............. *F01P 11/18* (2013.01); *G01F 23/72* (2013.01); *G01F 23/74* (2013.01); *H01H 9/08* (2013.01);
(Continued)

(58) Field of Classification Search
CPC .......... G01F 23/72; G01F 23/74; F01P 11/18; H01H 36/02
See application file for complete search history.

(56) References Cited

U.S. PATENT DOCUMENTS 3,678,750 A * 7/1972 DiNoia ................... G01F 23/72
                                                    73/DIG. 5
4,165,935 A * 8/1979 Bongort ................. H01H 36/02
                                                    335/207

(Continued)

FOREIGN PATENT DOCUMENTS

CN         106768178 B     5/2019
EP          0377508 A1     7/1990
(Continued)

*Primary Examiner* — Paul M. West
(74) *Attorney, Agent, or Firm* — ArentFox Schiff LLP

(57) ABSTRACT

The present disclosure relates to a coolant level sensor device for application in vehicles, comprising three interoperable component parts: a housing component, an interchangeable cartridge assembly, and a resistor pigtail. The housing component may be configured to permanently and/or semi-permanently reside within the engine cooling system such that the housing component may receive the interchangeable cartridge assembly selectively connected with the resistor pigtail. The interchangeable cartridge assembly may comprise a reed switch that may be replaceable when damaged. Further, the interchangeable cartridge mechanism may be configured to connect with the resistor pigtail, which may include at least one resistor, such that the at least one resistor may be removed from close proximity to the high temperatures generated by the engine, thus increasing the life of the resistor components. This three part configuration may allow for the easy replacement of elements of the coolant level sensor prone to failure, without the need to replace functioning components.

6 Claims, 9 Drawing Sheets

(51) Int. Cl.
  *G01F 23/72* (2006.01)
  *G01F 23/74* (2006.01)
  *H01H 11/00* (2006.01)
  *H01H 36/02* (2006.01)

(52) U.S. Cl.
  CPC .......... *H01H 11/005* (2013.01); *H01H 36/02* (2013.01); *F01P 2025/70* (2013.01)

(56) References Cited

U.S. PATENT DOCUMENTS

| | | | |
|---|---|---|---|
| 5,742,999 A | 4/1998 | Gomez | |
| 5,796,254 A * | 8/1998 | Andrus | H01H 51/282 |
| | | | 324/423 |
| 6,253,608 B1 | 7/2001 | Faulhaber | |
| 7,963,164 B2 | 6/2011 | Ross, Jr. et al. | |
| 7,997,132 B2 | 8/2011 | Ross, Jr. et al. | |
| 8,590,375 B2 | 11/2013 | Farmanyan | |
| 8,950,255 B2 | 2/2015 | Chang et al. | |
| 9,222,868 B2 | 12/2015 | Chen et al. | |
| 9,285,256 B1 | 3/2016 | Chang et al. | |
| 9,568,373 B2 | 2/2017 | Huang et al. | |
| 9,658,089 B2 | 5/2017 | Chang et al. | |
| 9,773,629 B1 | 9/2017 | Wu et al. | |
| 9,851,324 B1 | 12/2017 | Huang et al. | |
| 2005/0268715 A1* | 12/2005 | Sabatino | H05K 1/189 |
| | | | 73/313 |
| 2011/0271754 A1 | 11/2011 | Ross, Jr. et al. | |

FOREIGN PATENT DOCUMENTS

| | | |
|---|---|---|
| JP | 6312222 B2 | 3/2018 |
| TW | I453378 B | 9/2014 |
| TW | I473974 B | 2/2015 |
| TW | I521189 B | 2/2016 |
| TW | I649564 B | 2/2019 |
| TW | I652474 B | 3/2019 |

\* cited by examiner

INTERCHANGEABLE COOLANT SENSOR FOR VEHICLE APPLICATIONS AND METHODS OF MANUFACTURE AND USE THEREOF

BACKGROUND OF THE TECHNOLOGY

Field

Aspects of the present disclosure relate to a coolant level sensor device for use in vehicle applications and methods of manufacture and use thereof.

Background

Integral to our modern ability to control infectious diseases and maintain basic hygienic practices in densely populated areas, garbage trucks (interchangeably referred to herein as "waste removal vehicles") remove waste both from individual garbage cans in which people dispose of household waste, and commercial bins containing larger amounts of discarded goods. The waste collected in both household garbage cans and large scale bins is routinely collected by garbage trucks, in most areas in the United States approximately once a week, by a government or privately-run organized regional or society wide waste removal program. Thus, keeping cities and neighborhoods clean from excessive waste compilation relies heavily on the function of these garbage trucks.

In order to keep a garbage truck properly functioning and on the road collecting waste, much like any other vehicle, the garbage truck must have a functioning engine. Most frequently, waste removal vehicles are propelled by mechanical energy generated in an internal combustion engine via the extraction of mechanical energy from heat flows, where there is always more heat energy input than the maximum quantity of extractable mechanical energy output. Consequently, internal combustion engines, such as those used in waste removal vehicles, always produce some amount of waste heat. Waste heat, defined specifically as the difference between the heat energy entering the engine versus the mechanical energy extracted for useful work, must be actively removed from the engine in order to prevent the engine from reaching temperatures which would otherwise melt the materials from which the engine was constructed and could result in the severe damage or otherwise irreparable destruction of the engine. Thus, internal combustion engines typically include a liquid coolant system capable of controlling the temperature of the engine so as to prevent costly damage to the components comprising the engine itself.

However, just as the temperature of the engine may require careful monitoring and regulation to ensure engine safety and efficient operation, the temperature and levels of the liquid coolant may also need to be carefully monitored in order to ensure the engine cooling system remains operable. For example, if the coolant reaches its freezing point, the coolant will expand upon freezing, causing irreparable damage to its surroundings, potentially requiring the engine to be completely replaced. Further, if the amount of liquid coolant becomes too low, the coolant system may no longer be able to adequately cool or regulate the temperature of the engine. Thus, garbage trucks typically include both a coolant temperature sensor for monitoring the temperature and a coolant level sensor for monitoring the amount of the liquid coolant.

A traditional coolant level sensor is a device incorporated into a garbage truck engine cooling system, and may be configured to alert a driver of low levels of liquid coolant. The alert may allow the driver to add more liquid coolant to the cooling system before the engine becomes damaged or otherwise destroyed.

Despite the importance of the proper functioning of the cooling system to the overall health and function of an engine, current coolant level sensors widely used in garbage trucks and other similar waste removal vehicles are generally unreliable. For example, resistor components routinely fail because of constant exposure to high temperatures due to continuous proximity to the high temperature coolant. Further, reed switches are often destroyed or otherwise damaged because of the extreme forces applied to the vehicle during the waste removal process. This occurs, for example, when a garbage truck or similar waste removal vehicle lifts a dumpster over the windshield to the top of the cab before it dumps the garbage into the garbage containment area. In order to adequately remove all of the garbage from the dumpster, the dumpster may be slammed back and forth on top of the garbage truck, resulting in forces upwards of twenty-two times the force of gravity. The reed switch, which comprises glass and may be configured to only withstand forces five times the force of gravity, may thus be easily and often destroyed. Furthermore, once one component of the coolant level sensor fails, such as the reed switch, for example, the entire coolant level sensor must be replaced despite the fact that there remain many other perfectly functioning components in the malfunctioning coolant level sensor. Thus, the failure of one component of a coolant level sensor currently in use may result not only in the waste of resources based on disposing of functioning parts, but may also result in the loss of time and resources while the waste removal vehicle is non-operable due to replacement of the coolant level sensor. Additionally, because the entire coolant level sensor, as traditionally designed, resides within the cooling system, a mechanic must wait until the engine has sufficiently cooled in order to run any diagnostic tests on a potentially faulty coolant level sensor, or to replace the damaged or dysfunctional coolant level sensor, adding time to the replacement process during which the garbage truck could otherwise be used to collect waste.

Thus, there exists a need in the art for a coolant level sensor device that includes enhanced resistance to mechanical or electrical failure, or other dysfunction during the operation of a waste removal vehicle. Further, there exists an additional need in the art for a coolant level sensor that includes separate interoperable component parts, such that components likely to fail before other components may be easily replaced without the need to discard the entire coolant level sensor, and/or without the need to wait for the engine to sufficiently cool for replacement.

SUMMARY

Consequent to the problems and deficiencies as described above, as well as others, there remains an unmet need in the art for a coolant level sensor resistant to mechanical or electrical failure, or other dysfunction during use within a high force, severe vibration environment, wherein components of the coolant sensor deemed most likely to fail are easily replaceable without needing to replace the entire coolant level sensor or fully service the waste removal vehicle.

Thus, the aspects of the present disclosure relate to a coolant level sensor for application in garbage trucks or other similar vehicles, wherein the coolant level sensor may comprise three interoperable components parts, including a housing component, an interchangeable cartridge assembly, and a resistor pigtail (herein interchangeably referred to as a "resistor harness"). In aspects of the present disclosure, the housing component may be configured to receive an interchangeable cartridge assembly, wherein the cartridge assembly may be selectively connectable to the resistor harness. The housing component may be permanently or semi-permanently integrated into the coolant level sensor, as the comprising elements of the housing component may be unlikely to break or otherwise dysfunction when in proximity to the high temperatures of the liquid coolant. Conversely, the interchangeable cartridge assembly may include a reed switch configured within a pre-encapsulated cartridge, wherein the pre-encapsulated cartridge may be easily removable from the housing component when damaged, so that the interchangeable cartridge assembly may be easily replaced with a functioning interchangeable cartridge assembly. This configuration allows for the easy replacement of elements of the coolant level sensor that are prone to failure without a need to constantly replace the entire coolant level sensor, including elements that are otherwise in operating condition. Further, the interchangeable cartridge mechanism may be configured to selectively connect with the resistor harness, wherein the resistor harness may include two resistors removed from their original placement within the housing component. Consequently, the resistors may no longer be in proximity with the high temperatures of the engine and liquid coolant, which may greatly increase the life of the resistors included in the resistor harness, thereby reducing the need to replace the resistor harness.

The above presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

DETAILED DESCRIPTION

Figure 1:
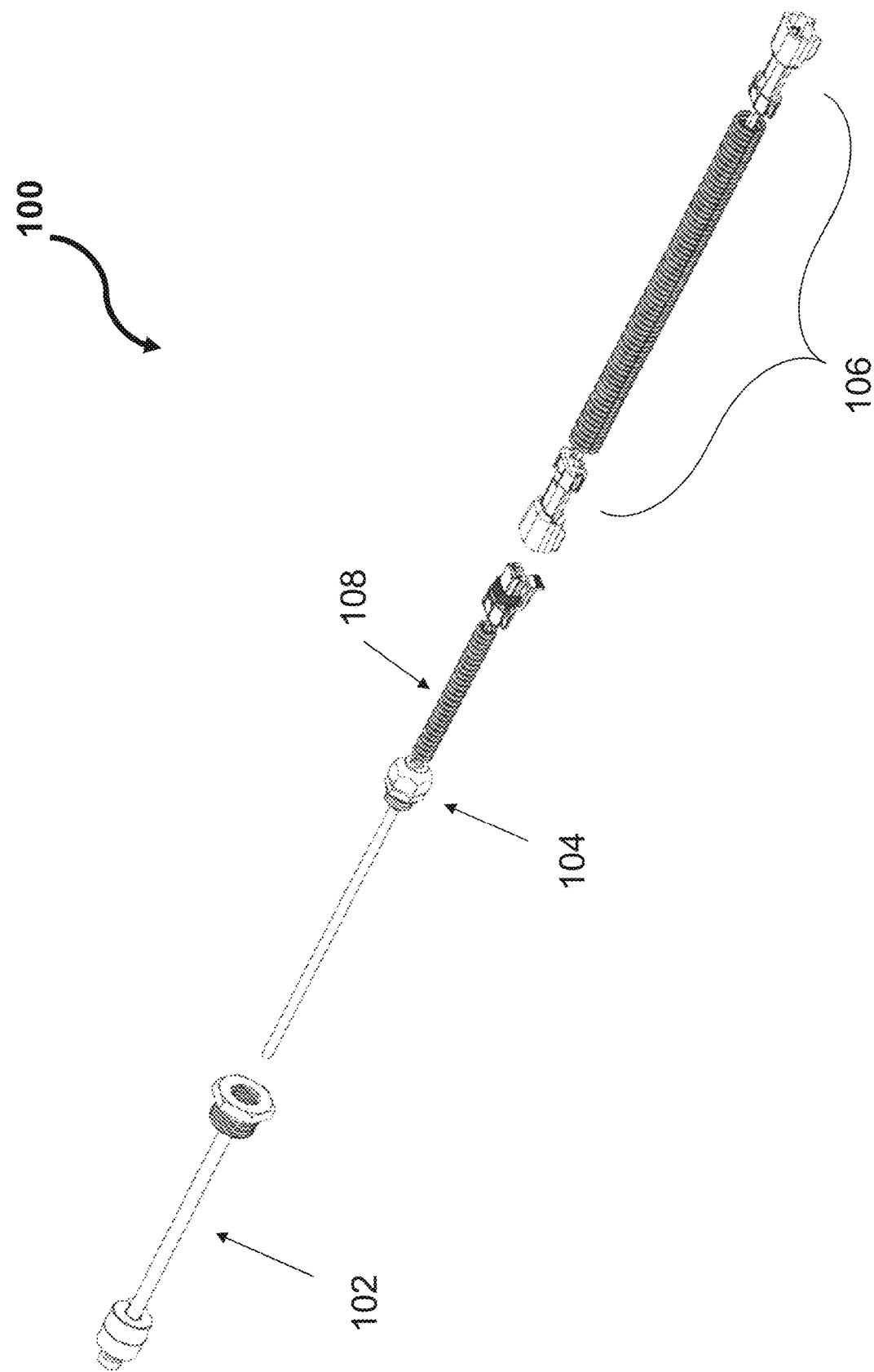
FIG. 1 illustrates a perspective view of an example coolant level sensor device, in accordance with aspects of the present disclosure.

FIG. 1, according to various aspects of the present disclosure, illustrates an example exploded perspective view of a coolant level sensor device 100 capable of monitoring the levels of liquid coolant within an engine cooling system. Coolant level sensor device 100 may comprise a interchangeable cartridge assembly 104, wherein interchangeable cartridge assembly 104 may be selectively receivable by a permanent and/or semi-permanent housing 102. Further, interchangeable cartridge assembly 104 may also be encapsulated by a sheath protector 108 and be selectively connectable to resistor pigtail 106. Permanent and/or semi-permanent housing 102 may be fixed within the cooling system, so as to be immersed or partially immersed in the liquid coolant. Constructing coolant level sensor device 100 may comprise three selectively connectable components that allow for the isolation of individual parts at high risk for damage or dysfunction, such that if one of the individual parts does become damaged or otherwise dysfunctional, only the one the connectable component comprising the dysfunctional or damaged individual part may need to be replaced.

Figure 2:
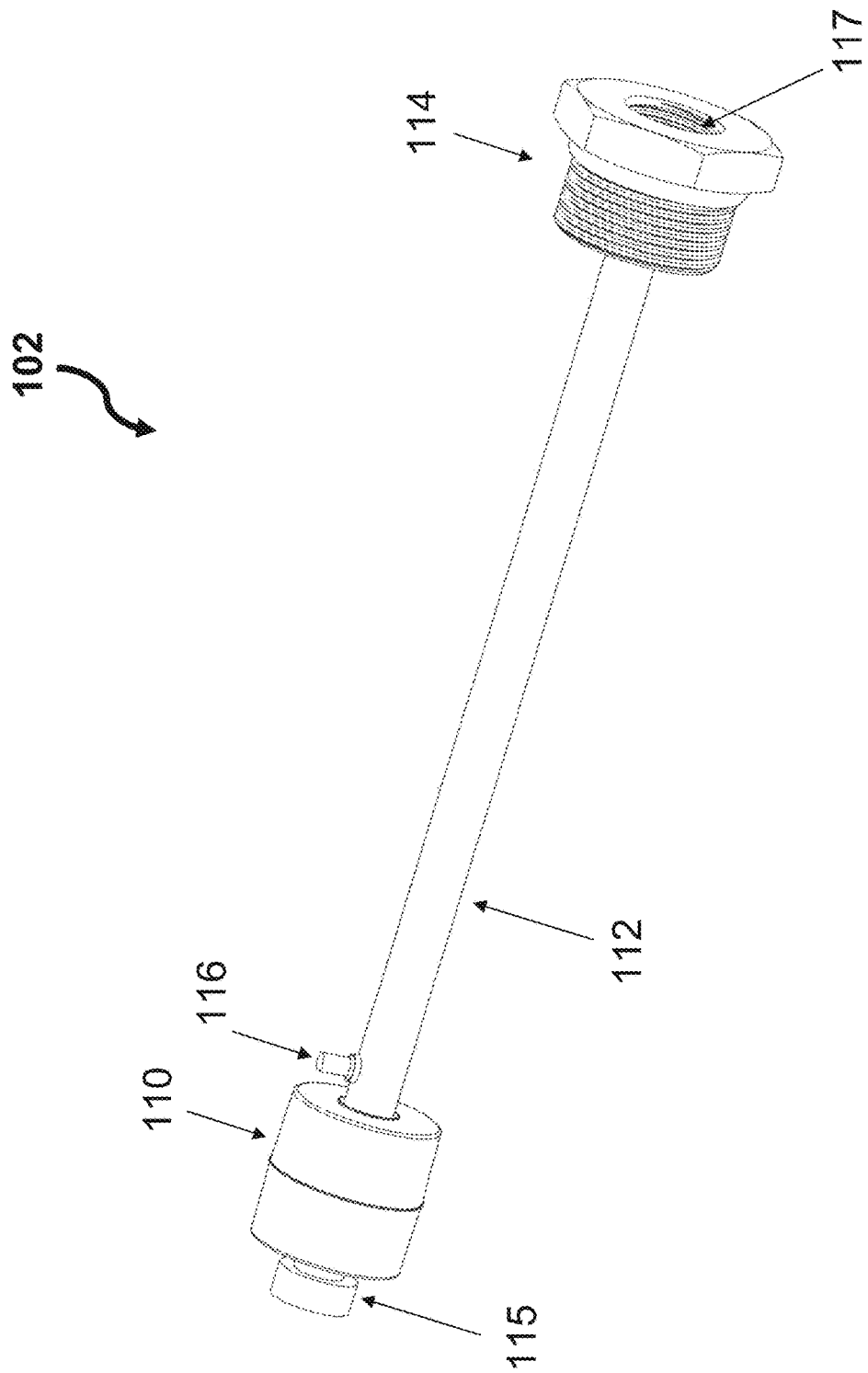
FIG. 2 illustrates a perspective view of an example housing component of a coolant level sensor, in accordance with aspects of the present disclosure.

According to various aspects of the present disclosure, FIG. 2 illustrates a perspective view of a permanent and/or semi-permanent housing 102, wherein permanent and/or semi-permanent housing 102 may be comprised of a variety of metals or metal alloys, such as stainless steel or aluminum, for example. Further, permanent and/or semi-permanent housing 102 may also include an encapsulating shaft 112, wherein encapsulating shaft 112 may contain an inner recess portion 117, such that inner recess portion 117 may accept interchangeable cartridge assembly 104. Furthermore, encapsulating shaft 112 may include a securing bolt 114 on one end with a float component 110 on the opposing end. Float component 110 (interchangeably referred to herein as "measuring component") may encapsulate shaft 112 such that float component 110 may not be removed from shaft 112, but is free to move with the level of liquid coolant between base 115 and containment peg 116. In one example, containment peg 116 may be formed from shaft 112, comprising the same material as shaft 112. However, in another example containment peg may be separately formed and then attached to encapsulating shaft 112. In one example, encapsulating shaft 112 may be cylindrical in shape, as illustrated in FIG. 2. However, the construction of encapsulating shaft 112 is not limited to a cylindrical shape. Alternatively, encapsulating shaft 112 may comprise any one or combination of polyhedral shapes that may include any plurality of sides.

Figure 3:
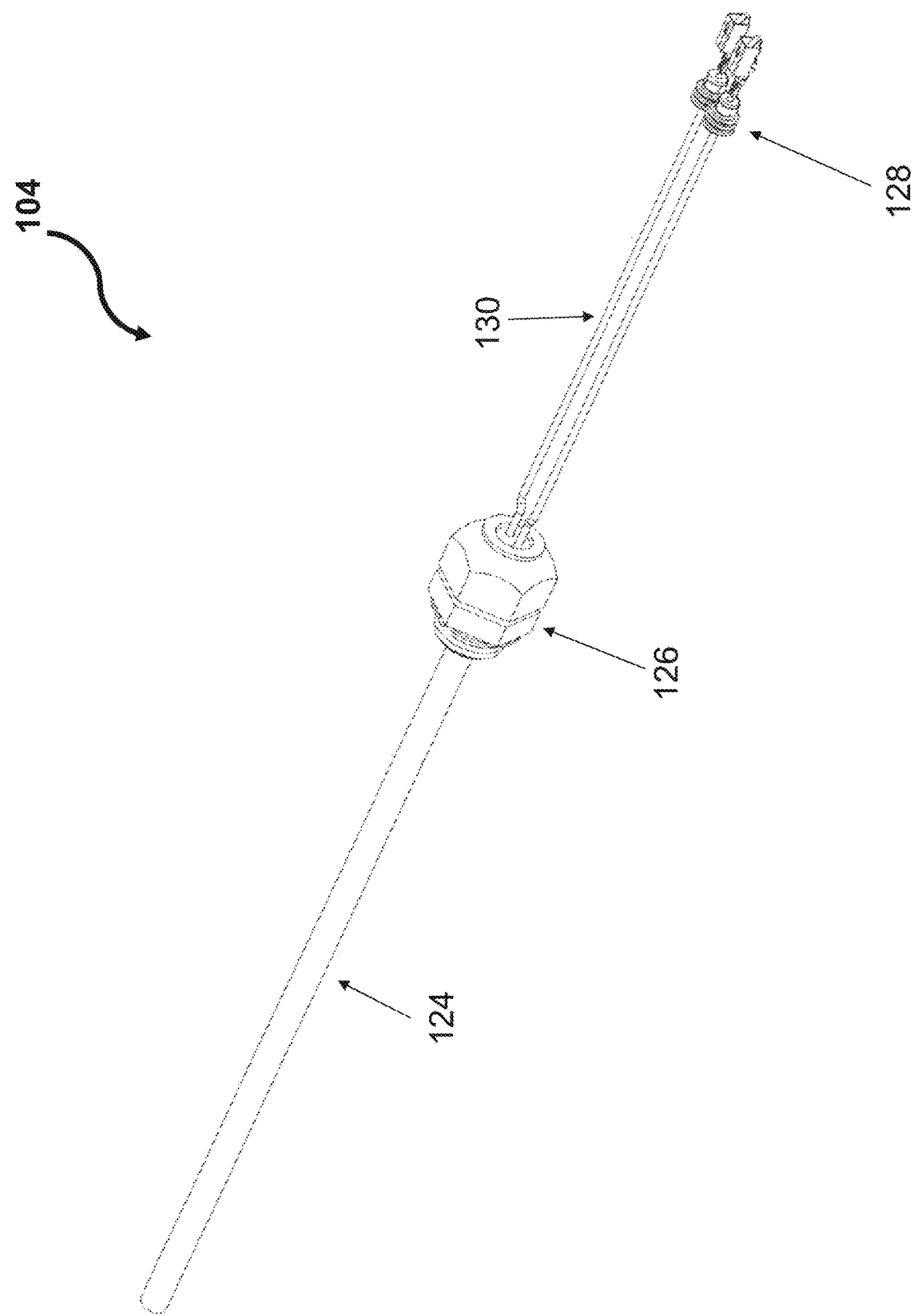
FIG. 3 illustrates a perspective view of an example cartridge assembly of a coolant level sensor, in accordance with aspects of the present disclosure.

FIG. 3, according to aspects of the present disclosure, illustrates an example interchangeable cartridge assembly 104, wherein interchangeable cartridge assembly 104 may include reed switch tube 124 extending from securing mechanism 126, such that reed switch tube 124 may be received within inner recess portion 117 of encapsulating shaft 112, as previously illustrated in FIG. 2. Further, interchangeable cartridge assembly 104 may comprise harness 130 connected to securing mechanism 126 on one end and wiring harness insert connectors 128 on the other end.

Figure 4:
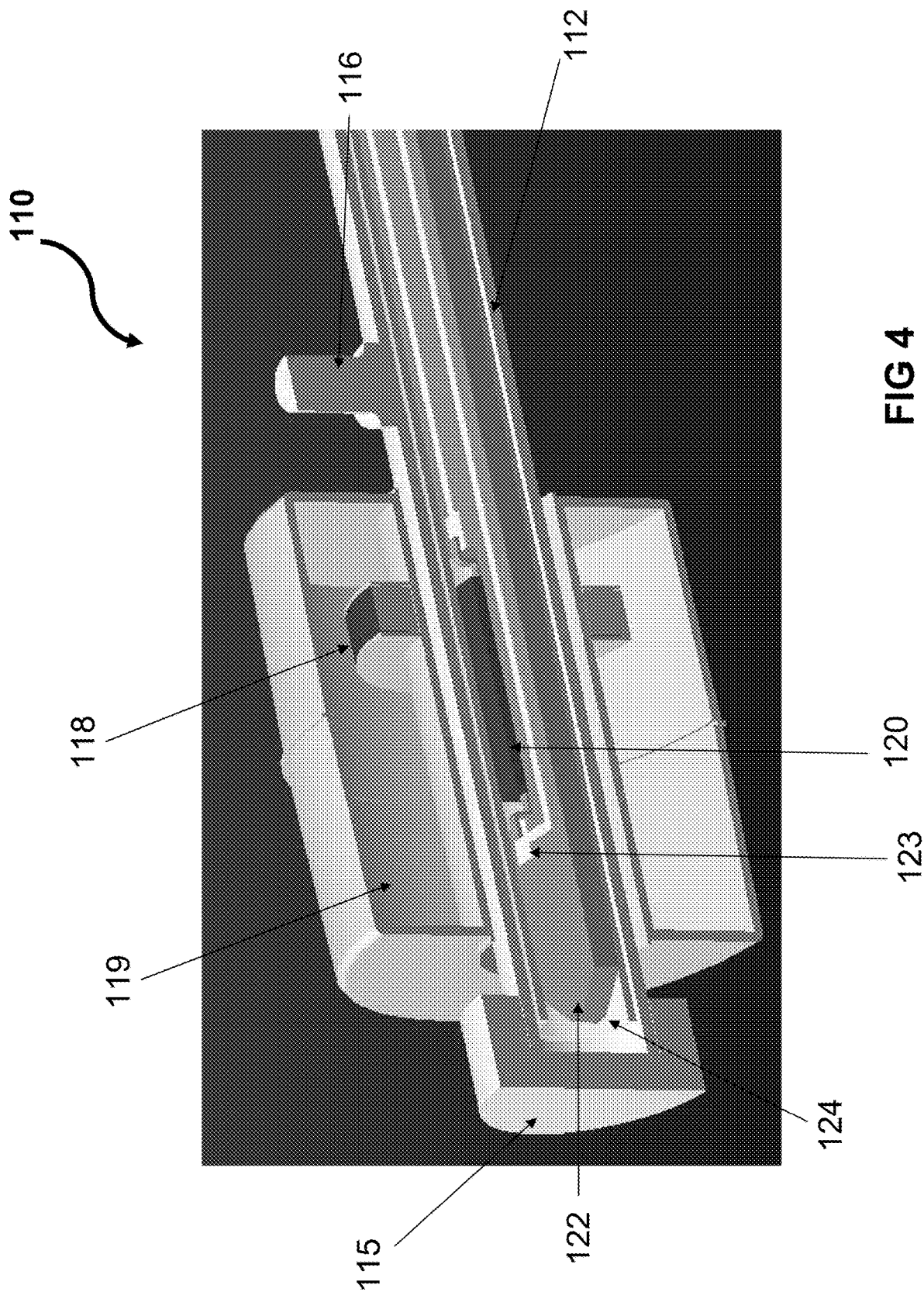
FIG. 4 illustrates a cross-sectional perspective view of an example housing and cartridge component of a coolant level sensor, in accordance with aspects of the present disclosure.

FIG. 4, according to aspects of the present disclosure, illustrates a cross-sectional perspective view of float component 110 and a cross-sectional perspective view of interchangeable cartridge assembly 104, wherein interchangeable cartridge assembly 104 is received within inner recess portion 117 of permanent and/or semi-permanent housing 102. Float component 110 may comprise a magnet 118, wherein magnet 118 may be encapsulated within inner cavity 119 of the interchangeable cartridge assembly 104. Magnet 118 may comprise iron, cobalt, nickel, alloys of rare earth metals, or any combination therein such that magnet 118 has magnetic properties such that magnet 118 may interact with a reed switch 120. Further, magnet 118 and inner cavity 119 of float component 110 may include a donut-hole shaped inner recess, such that float component 110 may move relative to shaft 112. Specifically, float component 110 may be sufficiently buoyant in comparison to the liquid coolant, so that at rest, float component 110 may reside approximately at the surface of the liquid coolant. Thus, when the level of liquid coolant decreases, the position of float component 110 relative to encapsulating shaft 112 may decrease, such that float component 110 may move toward base 115. Conversely, when the level of liquid coolant increases, the position of float component 110 relative to encapsulating shaft 112 may also increase, such that float component 110 may move toward containment peg 116. However, float component 110 may not be free to move along the entirety of encapsulating shaft 112. Instead, the movement of float component 110 may be confined to the space between base 115 and containment peg 116. Though, it is noted that the distance between base 115 and containment peg 116 is not limited to the distance illustrated in FIG. 4, and instead may be set to a variety of distances upon production.

Further, FIG. 4 illustrates an example cross-sectional perspective view of reed switch tube 124 or interchangeable cartridge assembly 104, wherein reed switch tube 124 comprises a reed switch 120 secured within a circuit board 123 such that reed switch 120 and circuit board 123 may be encapsulated in an epoxy 122. Epoxy 122 may be configured to have the same or similar dielectric constant as reed switch tube 124. If circuit board 123 and reed switch 120 are not entirely encapsulated by epoxy 122, garbage may fall onto circuit board 123 when being placed into the waste removal vehicle, destroying circuit board 123. Additionally, toxic chemicals leaking from the garbage containment area or from waste being dumped into the garbage containing area may destroy circuit board 123. Reed switch 120, in one example, may be comprised such that reed switch 120 may withstand the extreme forces regularly experienced by the waste removal vehicle, such that reed switch 120 may be less likely to be damaged or destroyed earlier than when it typically needs to be replaced. For example, the reed switch 120 may be designed to withstand 20 Gs of force or more. In another example, the reed switch may be comprised of glass.

Reed switch 120 may be positioned within reed switch tube 124 so as to be located proximal to float component 110 when float component 110 is located adjacent to containment peg 116. In this configuration, the magnet may be located such that reed switch 120 remains open, sending a signal to the garbage truck or waste removal vehicle computer (not shown). In one example, this signal may allow for the waste removal vehicle operator to be notified that there is sufficient liquid coolant within the engine cooling system. However, in another example, reed switch 120 in an open position may send a first transmission signal to the garbage truck computer (not shown), wherein there is no notification of sufficient liquid coolant levels for the waste removal vehicle operator. As described previously, when the level of liquid coolant decreases, float component 110 with magnet 118 may move relative to encapsulating shaft 112 toward base 115. Upon such movement, magnet 118 may be removed from proximity to reed switch 120 such that reed switch 120 closes, sending a second transmission signal to the waste removal vehicle computer (not shown) such that the waste removal vehicle operator may be notified of the low level of liquid coolant within the engine cooling system and prompted to add liquid coolant to the engine cooling system before the engine or any of its component parts become damaged or destroyed.

Figure 5:
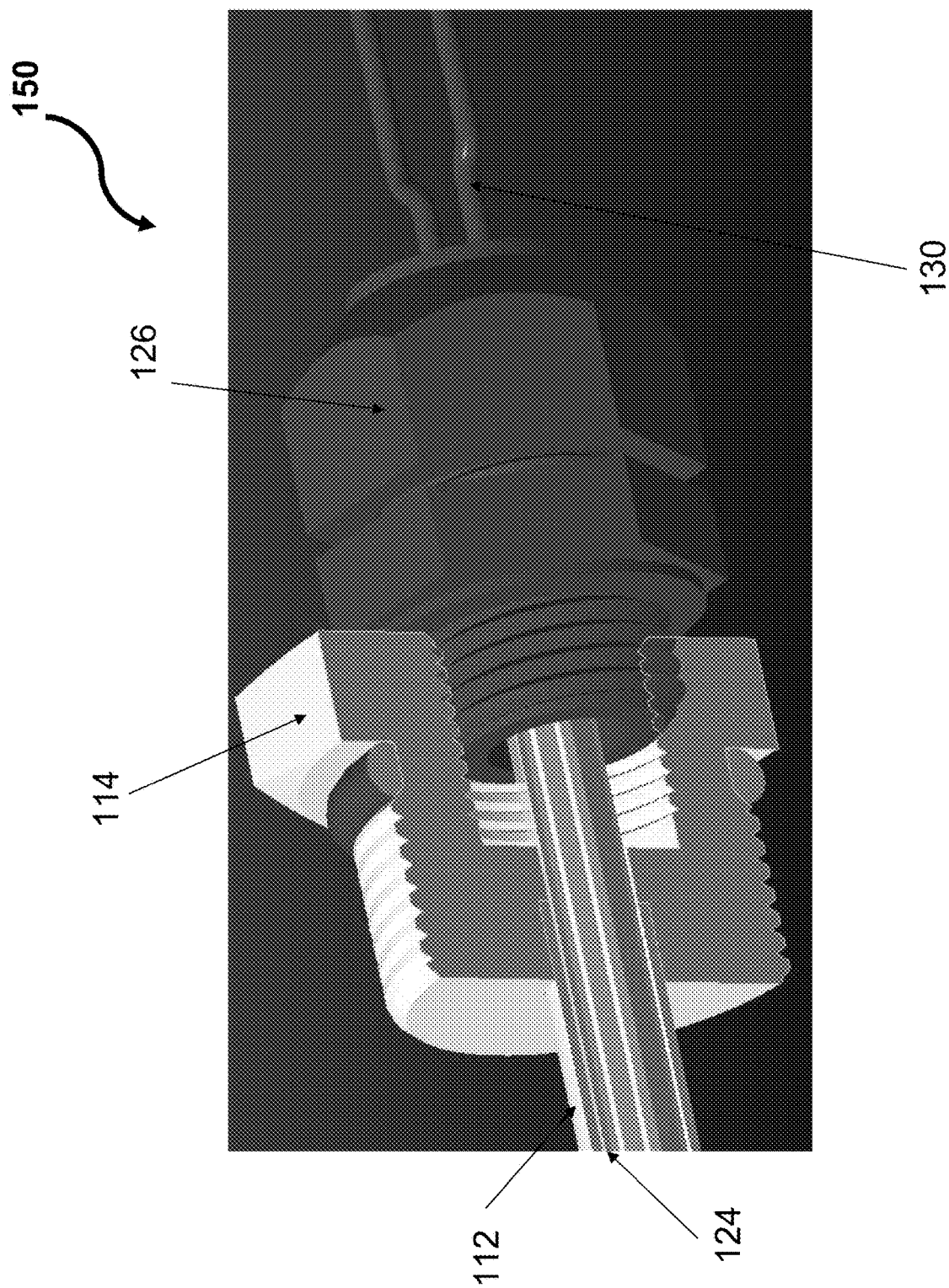
FIG. 5 illustrates a cross-sectional perspective view of an example securing point, in accordance with aspects of the present disclosure.

FIG. 5, according to aspects of the present disclosure, illustrates a cross-sectional perspective view of securing point 150, wherein securing point 150 includes the location where permanent and/or semi-permanent housing 102 interoperates with the interchangeable cartridge assembly 104. As illustrated, securing mechanism 126 may be selectively receivable by bolt 114, such that reed switch tubing 124 may be selectively receivable inside of encapsulating shaft 112, and further connectable to resistor pigtail 106 (interchangeably referred to herein as "resistor harness") via harness 130.

Figure 6:
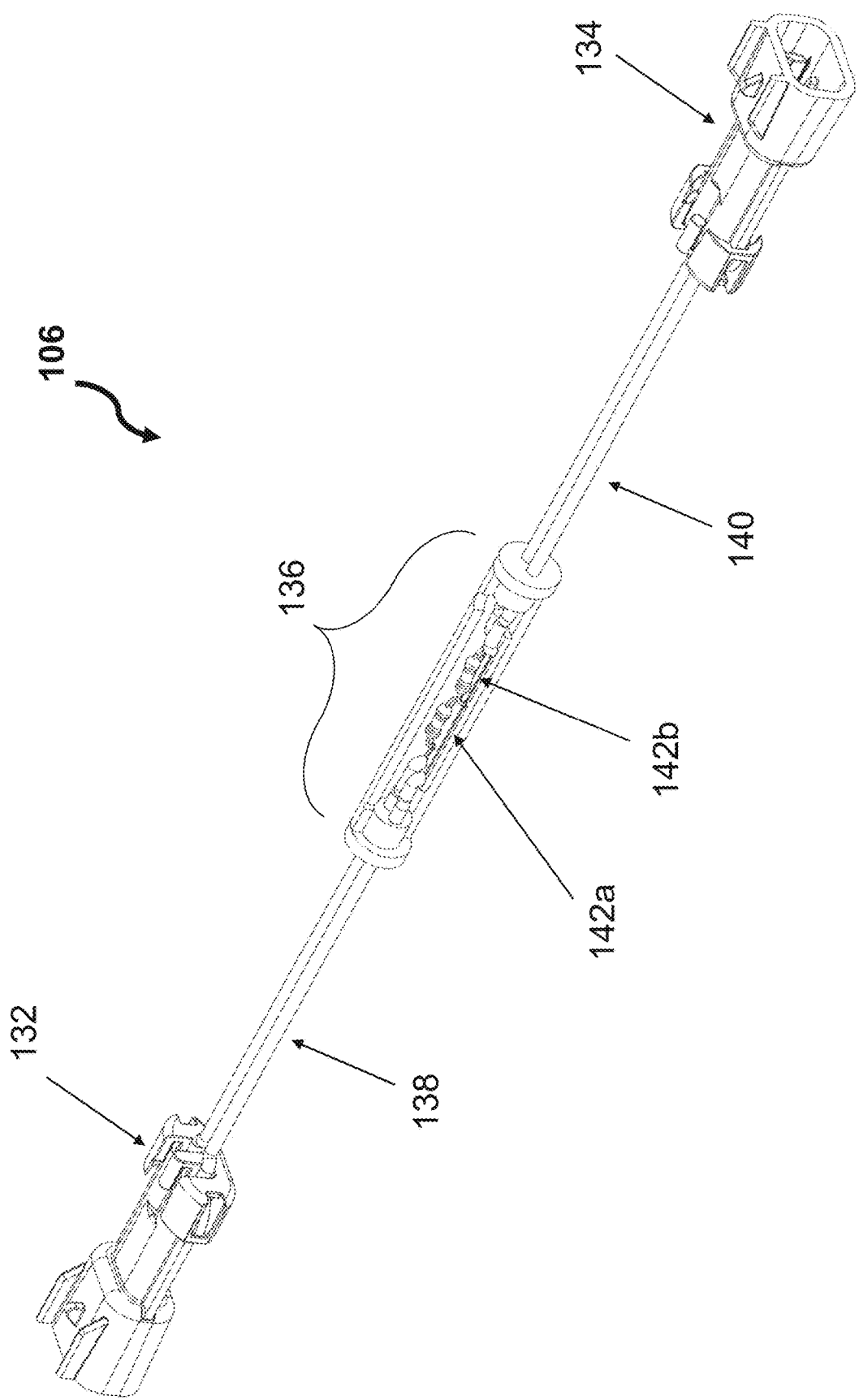
FIG. 6 illustrates a cross-sectional perspective view of an example resistor harness, in accordance with aspects of the present disclosure.

FIG. 6, according to aspects of the present disclosure, illustrates a perspective view of resistor pigtail 106, wherein resistor pigtail 106 comprises a resistor containment pod 136, a first harness 138, a second harness 140, and harness coupling pigtails 132 and 134. Resistor containment pod 136 may be connected to coupling pigtail 132 via first harness 138, and resistor containment pod 136 may be connected to coupling pigtail 134 via second harness 140. First and second harnesses 138 and 140 may be comprised of a plurality of wires, such as the two wires illustrated in FIG. 6, for example. Further, first and second harnesses 138 and 140 may electrically connect the reed switch to the waste removal vehicle computer via resistors 142a and 142b included in resistor containment pod 136. In one example, resistors 142a and 142b may be connected in parallel, so as to increase the length of time during which one of resistors 142a or 142b may remain operational by limiting that resistor's usage. However, in another example, resistors 142a and 142b may be connected in series. Further, although FIG. 6 illustrates two resistors, resistor 142a and 142b, any number of resistors may be used in the construction of resistor pigtail 106. As illustrated in FIG. 6, configuring resistors 142a and 142b to reside in resistor containment pod 136 removes resistors 142a and 142b from permanent and/or semi-permanent housing 102, wherein traditionally such resistors are typically positioned. Such a placement of resistors 142a and 142b in resistor pigtail 106 allows for resistors 142a and 142b to be removed from direct or close proximal exposure to the liquid coolant, such that resistors 142a and 142b are not routinely exposed to high temperatures. Thus, resistors 142a and 142b endure less heat-induced stress such that the coolant level sensor device 100 is less likely to send incorrect coolant level sensor readings to the waste removal vehicle computer, thus making damage to the engine of the garbage truck less likely.

Figure 7:
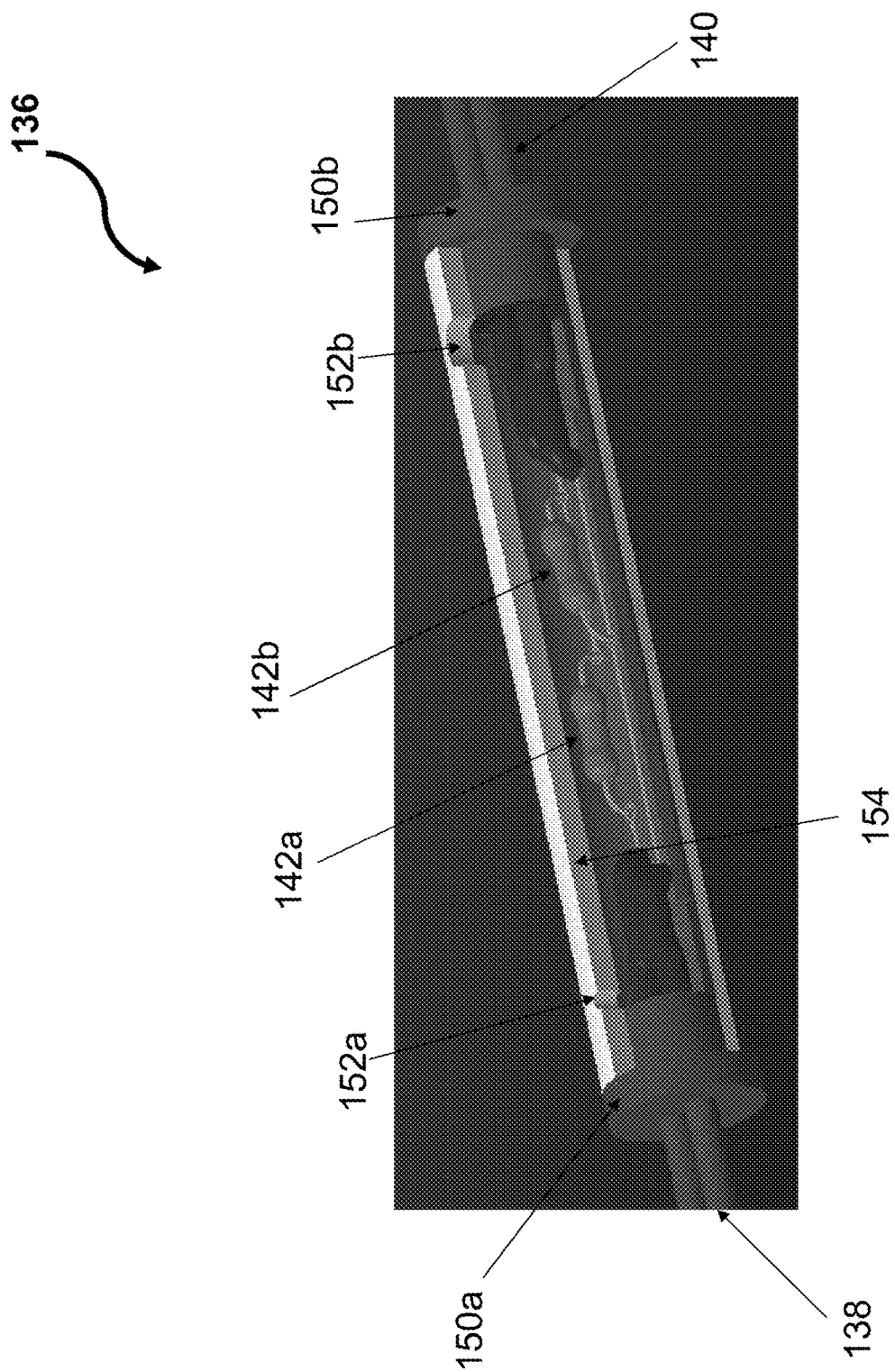
FIG. 7 illustrates a cross-sectional view of an example resistor containment pod of a coolant level sensor, in accordance with aspects of the present disclosure.

According to aspects of the present disclosure, FIG. 7 illustrates a cross-sectional perspective view of an example resistor containment pod 136. Resistor containment pod 136 may include resistors 142a and 142b electrically operable with a circuit board 156, such that resistors 142a and 142b and circuit board 156 may be enclosed by a tube 154. Further, tube 154 may be sealed at both ends, for example, on one end by an end cap 150a and on the other end by an end cap 150b, respectively. In one example, resistors 142a and 142b may be connected in parallel, so as to reduce the stress of either resistor 142a or 142b, for which each resistor regularly experiences, and thus increases the length of time in which the each resistor remains operational. However, in another example, resistors 142a and 142b may be connected in series. Further, tube 154 may include holes 152a and 152b. In one example, as illustrated in FIG. 7, hole 152b may be comparatively larger than hole 152a. As further explained below with regards to FIG. 8, hole 152b may receive epoxy in the process of constructing resistor containment pod 136. In the same process, hole 152a may provide a point at which air within tube 154 may escape the tube 154 when epoxy is being injected into resistor containment pod 136. In another aspect of the disclosure, resistor containment pod 136 may protect circuit board 156, and resistors 142a and 142b from high impact falling objects, toxic chemicals, moisture, and other potentially damaging objects or environmental conditions.

Figure 8:
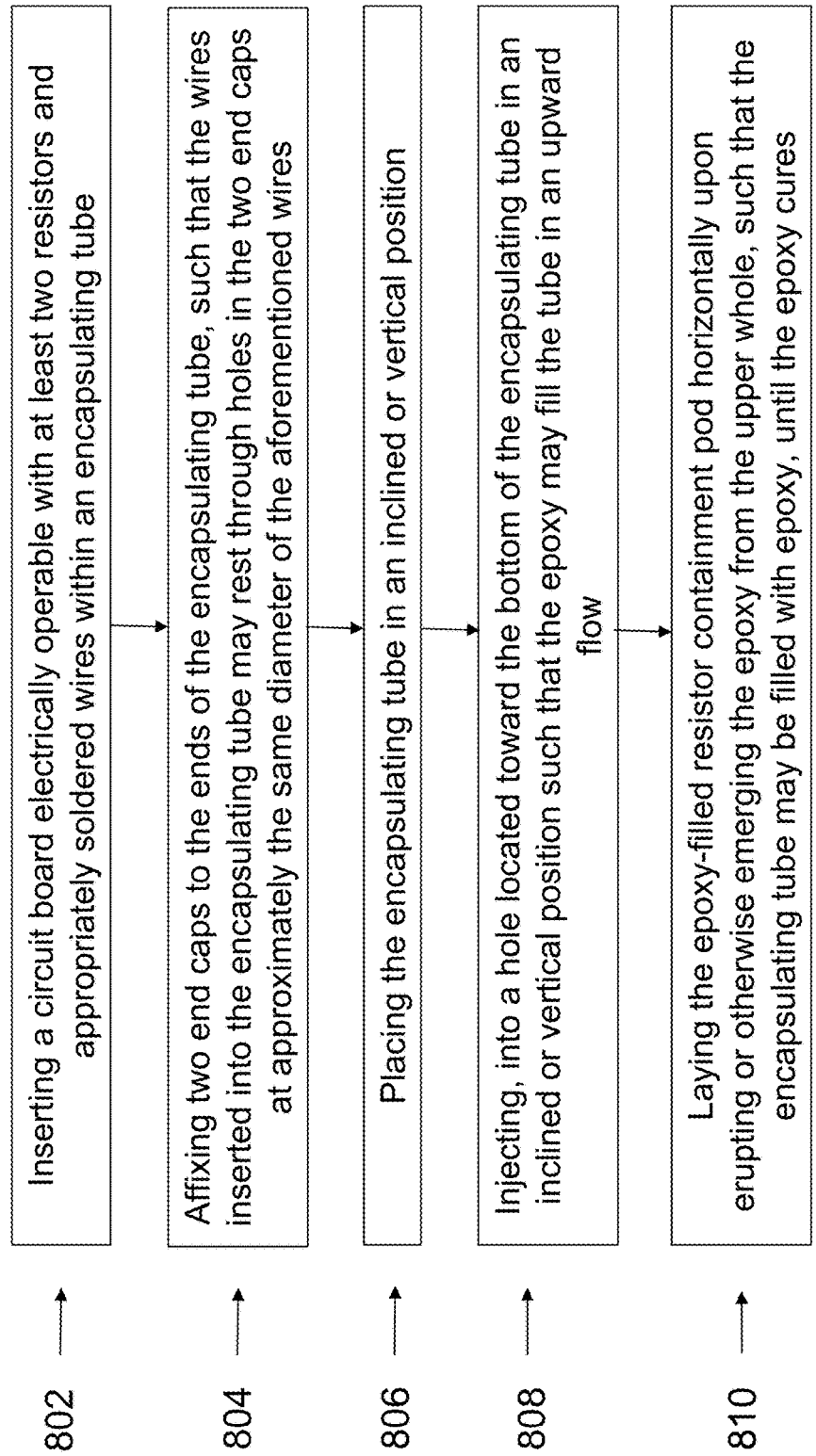
FIG. 8 illustrates a flowchart of one example implementation for a resistor containment pod construction method in accordance with aspects of the present disclosure.

Resistor containment pod 136 may be constructed via a resistor containment pod construction method 800, as illustrated in FIG. 8, according to various aspects. Referring to FIG. 8, method 800 may include at block 802 inserting a circuit board electrically operable with at least two resistors and appropriately soldered wires within an encapsulating tube, such as tube 154 of FIG. 7 (hereinafter interchangeably referred to as an "electrically interoperable system"). Further, at block 804 the method may include affixing two end caps, such as end caps 150a and 150b also illustrated in FIG. 7, to the ends of the encapsulating tube, such that the wires are inserted through the two end caps through appropriately sized holes in the aforementioned end caps. In one example, end caps may be affixed to the encapsulating tube via an adhesive substance such as glue, for example. Further, at block 806 the method may further involve placing the encapsulating tube in an inclined or vertical position. Further, at block 808 the method include may include, wherein epoxy may be injected into a hole located toward the bottom of the encapsulating tube in an inclined or vertical position such that the epoxy fills the tube in an upward flow. The upward flow may force air within the tube out of the tube through a hole located toward the top of the encapsulating tube in an inclined or vertical position, such that the hole located toward the top may be comparatively smaller than the hole located toward the bottom of the inclined or vertically positioned encapsulating tube, as described above. According to method 800, the epoxy may then erupt or otherwise emerge from the upper whole, such that the entire encapsulating tube does not contain any pockets of air or similar air bubbles. When the epoxy erupts from the upper hole, the method may include at block 810 laying the epoxy-filled resistor containment pod horizontally, such that the resistors and circuit board rest approximately parallel with the surface on which the resistor containment pod rests, until the epoxy has cured. Method 800 may further be employed to construct a resistor containment pod 136 capable of protecting the circuit board from high impact falling objects, toxic chemicals, moisture, or other similar potentially damaging objects, as described above.

Figure 9:
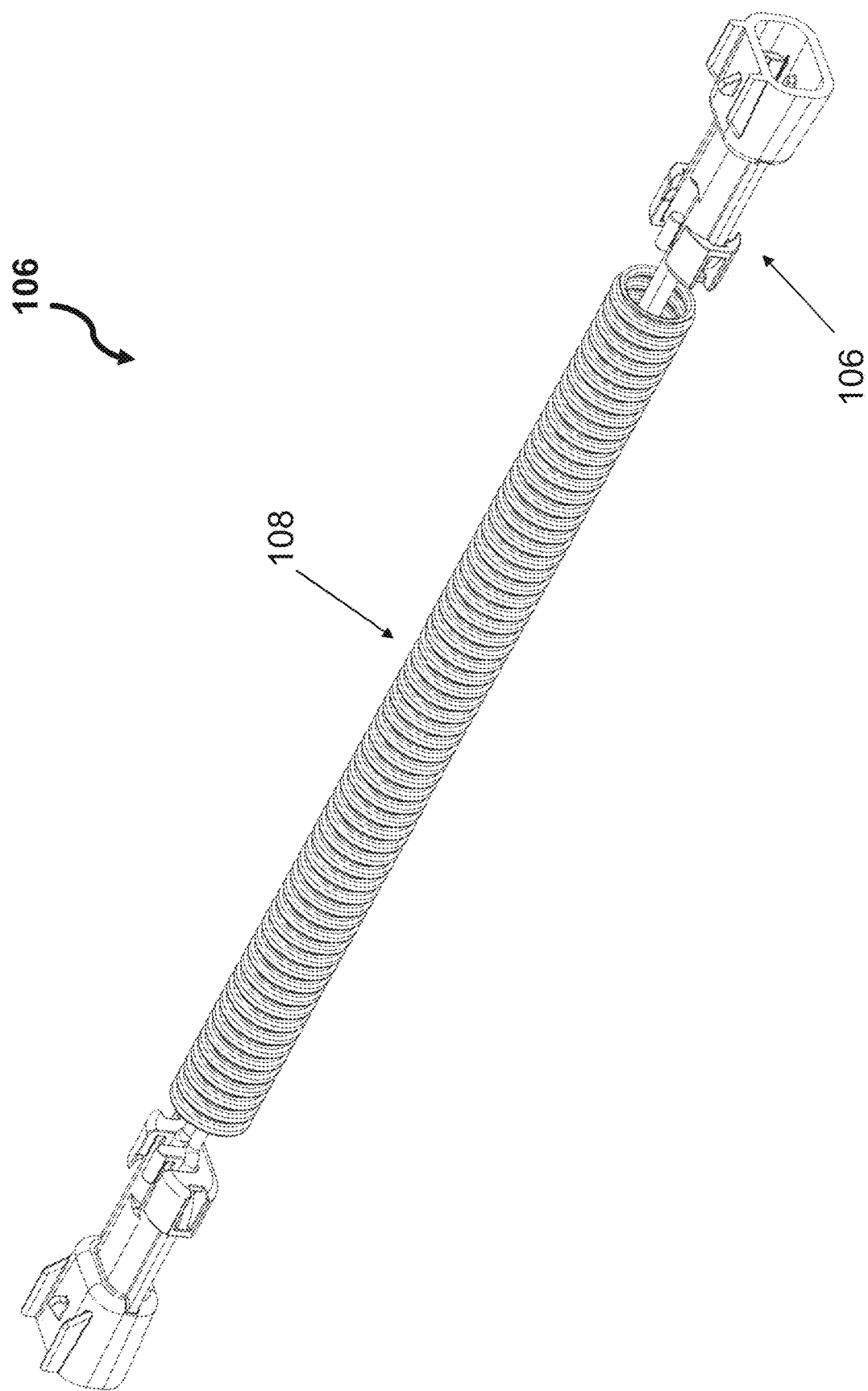
FIG. 9 illustrates a perspective view of an example sheath protected resistor pigtail, in accordance with aspects of the present disclosure.

FIG. 9, according to various aspects, illustrates a perspective view of resistor pigtail 106, wherein resistor pigtail 106 is further encapsulated by sheath protector 108. Sheath protector 108 may be configured to protect resistor pigtail 106 from a variety of potentially damaging environmental conditions inherent to operation within an engine. For example, sheath protector 108 may protect resistor pigtail 106 from high vibrations, high temperatures, falling garbage, and leaking chemicals, among other hazards, all of which may otherwise damage or destroy resistor pigtail 106. Sheath protector 108 may be comprised of a corrugated tube plastic, such as polyurethane, polyvinyl chloride, or polyethylene, for example, or any other material comprising protective properties.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

We claim:

1. A coolant level sensor device, comprising:
   a housing component, the housing component comprising:
     a receiving body, wherein the receiving body comprises an inner cavity extending a length of the receiving body;
     a measuring component positioned on one end of the receiving body, wherein the measuring component is configured to move relative to the receiving body;
     a magnet encapsulated by the measuring component; and
     an interchangeable cartridge assembly selectively receivable by the housing component, comprising:
       a reed switch;
       a connector mechanism selectively interoperable with the receiving body; and a tube encapsulating the reed switch, wherein the tube extends from the connector mechanism and is selectively receivable by the receiving body; and a resistor harness selectively connectable with the interchangeable cartridge assembly, comprising:

at least one harness coupling selectively connectable with the interchangeable cartridge assembly; and at least one resistor operably connected to the reed switch, wherein the at least one resistor comprises two resistors operably connected in parallel.

2. The coolant level sensor device of claim 1, wherein the reed switch is pre-encapsulated in a cartridge, and wherein the cartridge comprises:

an epoxy layer surrounding the reed switch; and a plastic housing surrounding the epoxy layer.

3. The coolant level sensor device of claim 1, wherein the resistor harness further comprises a protector, wherein the protector encapsulates the resistor harness.

4. The coolant level sensor device of claim 1, wherein the interchangeable cartridge assembly is configured to be removable.

5. The coolant level sensor device of claim 1, wherein the resistor harness is configured to be removable.

6. The coolant level sensor device of claim 1, wherein the housing component is configured to be removable.

* * * * *